(12) United States Patent
Darvish (10) Patent No.: US 7,546,194 B2
(45) Date of Patent: Jun. 9, 2009

(54) METHOD OF EVALUATING A MOVEMENT OF A MOTOR VEHICLE

(75) Inventor: Abtin Darvish, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 414 days.

(21) Appl. No.: 11/330,028

(22) Filed: Jan. 10, 2006

(65) Prior Publication Data

US 2006/0167605 A1 Jul. 27, 2006

(30) Foreign Application Priority Data

Jan. 25, 2005 (EP) ................................... 05001438

(51) Int. Cl.
*B60R 21/0132* (2006.01)
*G06F 19/00* (2006.01)
(52) U.S. Cl. .......................................... 701/45; 701/70
(58) Field of Classification Search ....................... None
See application file for complete search history.

(56) References Cited

U.S. PATENT DOCUMENTS

| 5,381,335 | A | * | 1/1995 | Wolf | 701/37 |
| 5,892,435 | A | * | 4/1999 | Buchheim et al. | 340/438 |
| 6,086,168 | A | * | 7/2000 | Rump | 303/191 |
| 6,275,755 | B1 | * | 8/2001 | Mon et al. | 701/45 |
| 6,427,130 | B1 | * | 7/2002 | Mergenthaler et al. | 702/142 |
| 6,463,379 | B1 | * | 10/2002 | Kohler et al. | 701/84 |
| 6,510,373 | B2 | * | 1/2003 | Grossardt et al. | 701/72 |
| 6,532,407 | B1 | * | 3/2003 | Fuhrer et al. | 701/38 |
| 6,553,294 | B1 | * | 4/2003 | Caruso et al. | 701/45 |
| 6,559,557 | B2 | * | 5/2003 | Manlove et al. | 307/10.1 |
| 6,714,847 | B2 | * | 3/2004 | Ota | 701/46 |
| 7,076,353 | B2 | * | 7/2006 | Ogata et al. | 701/45 |
| 7,236,864 | B2 | * | 6/2007 | Ogata et al. | 701/38 |
| 2002/0173882 | A1 | | 11/2002 | Tobaru et al. | 701/1 |
| 2004/0199317 | A1 | | 10/2004 | Ogata et al. | 701/45 |

FOREIGN PATENT DOCUMENTS

| EP | 0530755 A1 | * | 3/1993 |
| EP | 1293391 | | 3/2003 |
| JP | 2000-111571 | * | 4/2000 |

* cited by examiner

*Primary Examiner*—Michael J. Zanelli
(74) *Attorney, Agent, or Firm*—Jimmy L. Funke (57) ABSTRACT

The invention relates to a method of evaluating a movement of a motor vehicle, in particular of a vehicle movement influencing the safety of vehicle occupants, in which the acceleration of the vehicle in at least one linear direction, in particular in the direction of a vehicle axis, is measured a multiple of times, the time change of the vehicle acceleration in the at least one linear direction is determined and the determined time change of the vehicle acceleration in the at least one linear direction is taken into account in the evaluation of the vehicle movement. The invention furthermore relates to a method of activating a vehicle safety system and to an apparatus for the evaluation of a movement of a motor vehicle.

16 Claims, 4 Drawing Sheets

METHOD OF EVALUATING A MOVEMENT OF A MOTOR VEHICLE

TECHNICAL FIELD

The invention relates to a method of evaluating a movement of a motor vehicle, in particular of a vehicle movement influencing the safety of vehicle occupants.

BACKGROUND OF THE INVENTION

A method of this kind is generally known. It is used, for example, for the recognition of dangerous delays or of rolling or roll-over movements of the vehicle in order to be able to initiate suitable safety measures, as required, e.g. the tightening of seat belts, the triggering of airbags and/or the deploying of a roll-over bar or of a reinforced neck support.

A vehicle delay is typically determined by an acceleration sensor which monitors the acceleration of the vehicle in the direction of travel. The angular speed of the vehicle about its longitudinal axis and the lateral and vertical acceleration of the vehicle are usually measured for the determination of the rolling or rollover movement. The angle of roll or of rotation of the vehicle is determined by a numeric integration of the rolling rate or of the angular speed and is optionally corrected by the measured acceleration values in the lateral or vertical direction.

Typical rolling or rollover movements such as a rolling movement of a motor vehicle over a crash barrier or down an embankment take place comparatively slowly. The angle of roll of the motor vehicle in such cases usually increases from 0° to 90° in approximately 1 to 2 seconds, i.e. the vehicle tilts from a normal road holding position onto the side in 1 to 2 seconds. Since there is a comparatively low risk of head injury to the vehicle occupants with such a slow rolling movement, a detection time of approximately 600 to 700 ms, which corresponds to an angle of roll of approximately 30° to 40°, is sufficient in order, for example, to activate a rollover bar or an airbag.

However, faster rolling movements or rollover movements such as can occur on sand contact, i.e. on an at least partial skidding of the vehicle off a paved road, or on a contact of the vehicle with a curb, have proved to be problematic. For the effective avoidance of injuries to the vehicle occupants, a reliable detection of the rotational movement is already desirable in such cases on a tilting of the vehicle by less than 10°. This requires a fast detection of the rolling or rollover movement in the range of less than 300 ms.

To achieve such a fast detection time in the known method described above, the detection time can, however, not easily be reduced from 600 ms to 700 ms to less than 300 ms, since such a measure would increase the sensitivity of the method by so much that also such rotational movements of the vehicle would be recognized as rolling or rollover movements which are in reality not rolling or rollover movements at all.

The reason for this is that the rotation parameters such as the angle of roll or the angular speed of a tilting movement of a vehicle, which do not result in a roll-over, do not differ substantially in the course of the first 250 ms to 350 ms from those of a tilting movement which ultimately ends in a roll-over of the vehicle. Safety measures could therefore be initiated unnecessarily under certain circumstances.

SUMMARY OF THE INVENTION

It is the underlying object of the invention to provide a method of evaluating a movement of a motor vehicle which results in increased safety of vehicle occupants.

A method having the features of the claims is provided to satisfy this object.

In the method in accordance with the invention of evaluating a movement of a motor vehicle, in particular of a vehicle movement influencing the safety of vehicle occupants, the acceleration of the vehicle in at least one linear direction, in particular in the direction of a vehicle axis, is measured a multiple of times, the time change of the vehicle acceleration in the at least one linear direction is determined and the determined time change of the vehicle acceleration in the at least one linear direction is taken into account in the evaluation of the vehicle movement.

It is the general idea underlying the invention, to detect the time change of the vehicle acceleration, i.e. therefore a jolt of the motor vehicle, in at least one linear direction and to use the strength of the vehicle jolt to estimate the danger of the vehicle movement.

Since a movement of a motor vehicle endangering the safety of vehicle occupants typically starts with a jolt or is only triggered by a jolt of the vehicle of this type, the determination of the time change of the vehicle acceleration in a linear direction permits not only a particularly early estimate, but also a particularly reliable estimate of the danger of the vehicle movement. It can, for example, be predicted with a high probability with reference to the strength of a lateral vehicle jolt whether a rolling or roll-over movement of the vehicle will occur or not.

In the case of a correspondingly strong vehicle jolt, suitable safety measures can therefore be initiated at a particularly early time for the protection of the vehicle occupants, such as e.g. the tightening of seat belts, the triggering of airbags and/or the flipping up or deploying of a roll-over bar or of a reinforced neck support. Vice versa, with a comparatively low vehicle jolt, an initiation of unnecessary safety measures can be prevented. The safety of vehicle occupants is thereby substantially increased.

The time change of the vehicle acceleration in a linear direction or in a plurality of linear directions can be taken into account for the evaluation of the vehicle movement. These linear directions are preferably pre-set by the vehicle axes.

In this process, the determination of a lateral vehicle jolt, in other words a time change of the vehicle acceleration in the horizontal direction transversely to the longitudinal direction of the vehicle, i.e. in the Y direction, proves to be a particularly reliable means for the prediction of rolling or roll-over movements of the vehicle, since experience has shown that a rolling or roll-over movement of the vehicle about its longitudinal axis, for example when the vehicle skids off a paved roadway (sand contact) or on a contact, in particular a side contact, of the vehicle with a curb, is preceded by a lateral jolt.

If required, the determined time change of the vehicle acceleration in one or more further linear directions, for example in the longitudinal direction of the vehicle (X direction) and/or in the vertical direction (Z direction), can also flow into the evaluation of the vehicle movement in order to increase the precision of the evaluation of the vehicle movement or in order to improve the prediction result.

Advantageous embodiments of the invention can be seen from the dependent claims, from the description and from the drawing.

In accordance with a preferred embodiment of the method in accordance with the invention, the time change of the vehicle acceleration is determined from two measured acceleration values. In more precise terms, the determination of the time change of the vehicle acceleration takes place by the formation of the difference between two acceleration values preferably measured successively. In other words, the vehicle jolt represents the change of the vehicle acceleration during a pre-determined time interval, i.e. therefore the time derivation of the vehicle acceleration.

The measuring data of already present acceleration sensors can be used for the determination of the vehicle jolt. The method can thereby easily be integrated into an existing vehicle safety system. Only a change in the calculation algorithm, in other words a simple reprogramming of a corresponding evaluation unit, is required for this.

The time change of the vehicle acceleration is advantageously determined at least at times periodically with the period T1. The length of the period T1 is preferably selected to be particularly short and ideally corresponds to the time interval in which the measured values of the acceleration sensors are polled. The length of the period T1 can, however, also amount to a multiple of these intervals. So that the recognition of a dangerous vehicle movement, for example a rolling or rollover movement, can take place in approximately 100 ms to 200 ms, the length of the period T1 should, however not amount to more than a few 10 ms.

As has already been mentioned, the time change of the vehicle acceleration is calculated from the difference between two acceleration values which were measured with an interval of one period length. The acceleration difference for the calculation of the vehicle jolt would have to be divided by the length of the period T1 in a correct procedure. With a constant period length T1, however, it is easier to define the length of the period T1 as "1". A vehicle jolt standardized to the length of the period T1 is calculated in this manner.

In accordance with a further advantageous embodiment, a counter contributing to the evaluation of the vehicle movement is incremented when the time change of the vehicle acceleration of a period T1 exceeds a threshold value. The counter can be reduced accordingly when the time change of the vehicle acceleration of a period T1 is below the threshold value.

After every determination of the time change of the vehicle acceleration, the determined vehicle jolt is therefore compared with a threshold value and a check is made whether the determined vehicle jolt is above or below the threshold value. On every exceeding of the threshold value, the counter is incremented and/or the counter is reduced if the threshold value is not reached. In other words, the counter is a measure for how often the determined time change of the vehicle acceleration has exceeded or is below the threshold value. The counter is thus an indicator of the degree and duration of the determined vehicle jolt.

The incrementing and/or reducing of the counter can in each case take place by a pre-determined fixed amount, in particular a whole-number amount.

The incrementing and/or reducing of the counter advantageously take/takes place, however, by a pre-determined amount, in particular a whole-number amount, whose magnitude is dependent on the deviation of the determined change of the vehicle acceleration from the threshold value.

For example, the counter can be incremented or reduced by the value "1" on a low exceeding or falling below, by the value "2" on a medium exceeding or falling below and by the value "4" on a particularly high exceeding or falling below of the threshold value. The above values are named purely by way of example and can also be selected differently depending on the application.

It is equally possible to divide the measured time changes of the vehicle accelerations into fewer or more categories than the named categories "low", "medium" and "high". It is furthermore possible to fix the named categories and/or values for the exceeding of the threshold value and for the not reaching of the threshold value at different levels.

The degree of the measured time change of the vehicle acceleration is taken into account in a particular manner by the increment or reducing of the counter matched to the degree of difference of the vehicle jolt from the threshold value. A strong vehicle jolt can thereby be detected particularly rapidly. This permits a still faster recognition of a dangerous vehicle movement, e.g. an even faster prediction of a rolling or rollover movement, and thereby a still earlier activation of the vehicle safety system.

Alternatively, the increment and/or reducing of the counter can be proportional to the deviation of the determined time change of the vehicle acceleration from the threshold value. With this variant, the degree of the deviation of the determined vehicle jolt from the threshold value also has a direct effect on the amount of the increment or reducing of the counter. This variant thus likewise permits a particularly fast recognition of a dangerous vehicle jolt or of a particularly fast prediction of a dangerous vehicle movement and thereby ultimately an increased safety of the vehicular occupants.

The vehicle movement is preferably classified as critical when the counter exceeds a pre-determined threshold counter value. How long the determined vehicle jolt of a specific degree remains out of consideration or from when it is classified as dangerous is fixed by the threshold counter value.

For instance, the threshold counter value can be exceeded when the determined time changes of the vehicle acceleration only slightly exceed the pre-determined threshold value or even fall below it at times over a duration of a plurality of periods T1. A comparatively weak vehicle jolt can thus also be recognized early by a corresponding fixing of the threshold counter value.

If the counter is incremented in dependence on the degree of the deviation of the time change of the vehicle acceleration from the threshold value, the counter can also already exceed the threshold counter value after a few periods T1, for example one or two periods, with a corresponding strength of the vehicle jolt and with a corresponding pre-setting off the increment by which the counter is increased. A strong vehicle jolt can thus be detected particularly fast and corresponding safety measures can be initiated even earlier.

In accordance with a further advantageous embodiment of the method in accordance with the invention, a second time change of the vehicle acceleration is additionally determined from two acceleration values which define a time interval T2 which is a whole-number multiple of the period T1.

The vehicle jolt is therefore determined, on the one hand, periodically with a period T1 and, on the other hand, additionally over a plurality of periods T1. In other words, a periodic determination of two time changes of the vehicle acceleration over time windows of different length takes place.

Short-term fluctuations of the first determined time change of the vehicle acceleration, which can be caused, for example, by errors in the measurement of the vehicle accelerations, are kept out of account by the determination of the second time change of the vehicle acceleration over a longer period of time. The reliability of the detection of a vehicle jolt to be classified as dangerous is hereby substantially increased.

The vehicle movement is preferably classified as critical when both the second time change of the vehicle acceleration and every first time change of the vehicle acceleration determined within the time interval T2 each exceed a pre-determined threshold value. The threshold values for the first and the second time changes of the vehicle acceleration can be selected to be the same or different, with the threshold value for the first time change of the vehicle acceleration preferably having to be selected to be somewhat lower than the threshold value for the second time change of the vehicle acceleration in the latter case.

Since the vehicle movement is only classified as critical when all time changes of the vehicle acceleration, i.e. both all first time changes and the second time change of the vehicle acceleration, exceed their respective threshold value, it is ensured that without exception only relevant vehicle movements are classified as dangerous. This increases the reliability of the recognition of a dangerous vehicle movement and prevents an unnecessary initiation of safety measures.

A further subject of the invention is a method of activating a vehicle safety system in which the vehicle safety system is activated when a movement of a motor vehicle detected in accordance with a method in accordance with the claims is classified as critical.

Since the activation of the vehicle safety system is based on the method in accordance with the invention for the evaluation of a movement of the motor vehicle, the aforesaid advantages apply accordingly.

Since a time change of the vehicle acceleration in at least one linear direction, i.e. a jolt of the motor vehicle is taken into account on the evaluation of the motor vehicle, said jolt, as experience has shown, being at the start of a dangerous vehicle movement or triggering it, a vehicle movement endangering the safety of vehicle occupants can be detected at a particularly early time. This permits a particularly fast and, above all, timely initiation of safety measures for the protection of the vehicle occupants, whereby the safety of the vehicle occupants is substantially increased.

The vehicle safety system is advantageously only activated when the angular position, the angular speed and/or the angular acceleration of the vehicle with respect to a vehicle axis or to a plurality of axes additionally lies or lie within a respective pre-determined critical range. In this manner, an unnecessary activation of the vehicle system can be avoided, for example when a lateral vehicle jolt classified as dangerous ultimately and against all expectations does not change into a rolling or roll-over movement of the vehicle.

A further subject of the invention is moreover an apparatus for the evaluation of a movement of a motor vehicle, in particular of a vehicle movement influencing the safety of vehicle occupants, comprising at least one sensor for the measurement of the acceleration of the vehicle in at least one linear direction, in particular in the direction of a vehicle axis, a calculation unit connected to the sensor for the determination of the time change of the vehicle acceleration from two measured acceleration values, a comparator unit connected to the calculation unit for the comparison of the determined time change of the vehicle acceleration with a pre-determined threshold value and an evaluation unit connected to the comparator unit for the evaluation of a deviation of the determined time change of the vehicle acceleration from the threshold value.

The methods in accordance with the invention can be carried out and the advantages associated therewith can be achieved with the apparatus in accordance with the invention.

The calculation unit for the determination of the time change of the vehicle acceleration, the comparator unit and the evaluation unit can each be separate units, but are preferably combined in a central calculation unit.

The increment and/or reducing of a counter contributing to the evaluation of the time change of the vehicle acceleration is preferably carried out in the evaluation unit.

Alternatively, first and second time changes of the vehicle acceleration can be determined in the calculating unit over respective time intervals of different lengths, i.e. having different period lengths T1 and T2, can be compared with pre-determined threshold values in the comparator unit and corresponding deviations from the threshold value can be evaluated in the evaluation unit.

BRIEF DESCRIPTION OF THE DRAWINGS

The invention will be described in the following purely by way of example with reference to an advantageous embodiment and to the enclosed drawing. There are shown.

DESCRIPTION OF THE PREFERRED EMBODIMENT

The method shown in FIG. 1 for the evaluation of a movement of a motor vehicle is based on the evaluation of a counter Z which is always incremented when a time change R(n) of the vehicle acceleration, i.e. a jolt of the vehicle, determined from measured accelerations exceeds a pre-determined threshold value and which is always reduced when the vehicle jolt R(n) falls below the threshold value.

In the present embodiment, only the lateral movement of the motor vehicle is evaluated, i.e. the horizontal movement transversely to the longitudinal direction of the vehicle. The lateral movement is also termed the movement in the Y direction.

Additionally or alternatively, however, the vehicle movement in the longitudinal direction of the vehicle, i.e. in the X direction, and/or the vehicle movement in the vertical direction (Z direction) can also be evaluated. For this purpose, only corresponding sensors have to be provided for the measurement of the acceleration of the vehicle in the X direction or the Z direction. The determination of the time change of the vehicle acceleration and the evaluation of the movement of the vehicle in the X direction or the Z direction take place in accordance with the method described in the following.

The method is started on the activation of the motor vehicle, for example by the switching on of the engine. An initialization of the counter Z takes place at the start of the method by which the counter Z is reset to the value "0".

At regular intervals, every 1 ms in the present embodiment, the acceleration of the motor vehicle in the Y direction is measured by means of a suitable acceleration sensor. The measurement of the vehicle acceleration thus takes place periodically with a period length T1 which amounts to 0.1 ms in the present case. Every period T1 defines a calculation step n in which the lateral vehicle jolt R(n) of the motor vehicle is determined from two respective sequentially measured acceleration values a(n) and a(n−1).

The vehicle jolt R(n) is understood as the change of the vehicle acceleration over the time of a period T1. To simplify the calculation effort, the evaluation of the vehicle movement takes place with reference to standardized time changes of the vehicle acceleration, i.e. the vehicle jolt R(n) is not calculated as an acceleration change per time unit, but per period length T1, which—for reasons of simplicity—is fixed to the value "1". Ultimately, therefore, the difference between respective sequentially measured acceleration values a(n) and a(n−1) serves as the measure for the vehicle jolt R(n).

Figure 1:
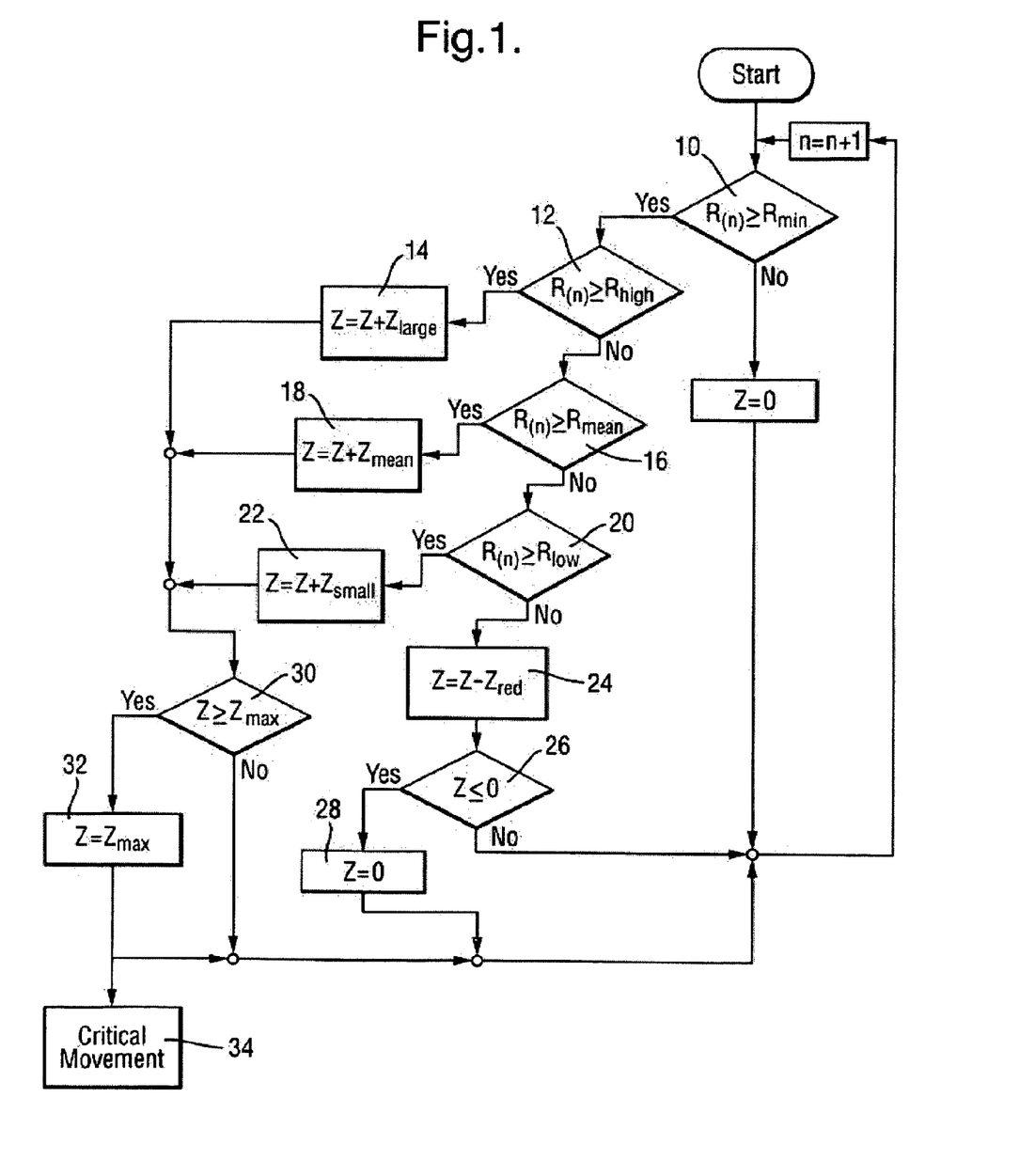
FIG. 1 is a flowchart of an embodiment of the method in accordance with the invention for the evaluation of a movement of a motor vehicle.

Referring to FIG. 1. as soon as a vehicle acceleration a(n) is measured and the associated time change R(n) was determined in an nth calculation step, a check is made in a method step 10 whether the amount of the determined angular acceleration R(n) exceeds a pre-determined minimum threshold $R_{min}$.

Provided the time change R(n) of the vehicle acceleration remain/remains below the minimum threshold value $R_{min}$, the counter Z is left at its starting value "0" or is reset to "0" and the polling of the vehicle acceleration and the determination of the vehicle jolt are repeated in a next calculation step n+1.

If, in contrast, the determined time change R(n) of the vehicle acceleration exceeds the minimum threshold value $R_{min}$, the counter Z is changed.

For this purpose, a check is next made in a method step 12 whether the time change R(n) of the vehicle acceleration exceeds a high threshold value $R_{high}$. If this is the case, the counter Z is incremented by a large value ΔZ in a method step 14.

If the determined angular acceleration R(n), however, does not exceed the high threshold value $R_{high}$, a check is next made in a method step 16 whether the time change R(n) of the vehicle acceleration exceeds a mean threshold value $R_{mean}$. If this is the case, the counter Z is incremented by a mean value $\Delta Z_{mean}$ in a method step 18.

If the amount of the determined time change R(n) of the vehicle acceleration also does not exceed the mean threshold value $R_{mean}$, a check is next made in a method step 20 whether the time change R(n) of the vehicle acceleration exceeds a pre-determined low threshold value $R_{low}$. If this is the case, the counter Z is incremented by a small value $\Delta Z_{small}$ in a method step 22.

If the determined vehicle jolt R(n) also does not exceed the low threshold value $R_{low}$, the counter Z is reduced by a pre-determined amount $\Delta Z_{red}$ in a method step 24.

In this case, a check is made in a following method step 26 whether the counter Z has become smaller than "0" by the reduction. If this is the case, the counter Z is reset back to a value "0" in a method step 28. If, however, the counter Z has remained positive after the reduction in step 24, then it maintains its current value and transfers it into the next calculation step n+1.

In the event of an increment of the counter Z in accordance with any one of the steps 14, 18 or 22, a check is made in a method step 30 whether the counter Z exceeds a threshold counter value $Z_{max}$. If this is not the case, the counter Z maintains its current value and the process continues in the next calculation step n+1 with the method step 10.

If, in contrast, an exceeding of the threshold counter value $Z_{max}$ is found in the method step 30, the threshold value $Z_{max}$ is associated with the counter Z in a method step 32.

An exceeding of the threshold counter value $Z_{max}$ has the result that the movement of the motor vehicle is classified as critical in a method step 34. The exceeding of the counter threshold value $Z_{max}$, in other words, characterizes a critical vehicle jolt and represents an indicator for a movement of the vehicle endangering the safety of the vehicle occupants. In the observation of the lateral vehicle jolt in accordance with the present embodiment, the exceeding of the counter threshold value $Z_{max}$ is, for example, an indication for a directly impending roll-over of the vehicle.

A critical vehicle movement can be initiated, on the one hand, by a particularly high time change R(n) of the vehicle acceleration within a period T1 or within fewer periods T1, i.e. by a short sharp vehicle jolt and, on the other hand, by smaller time changes R(n) of the vehicle acceleration which occur over a plurality of periods T1.

As was already mentioned, the time changes R(n) of the vehicle acceleration in the embodiment of the method shown are standardized to a period length T1 of "1". The threshold values named above for the time change of the vehicle acceleration therefore have the same physical unit in the present embodiment as the vehicle acceleration and are given here in [g], with 1 g≈being 9.81 m/s²

A possible value for the minimum threshold $R_{min}$ of the time change R(n) of the vehicle acceleration standardized to the period length T1 lies, for example, between 1 g and 3 g. In contrast, the low threshold value $R_{low}$ for the time change of the vehicle acceleration can lie between 2 g and 5 g, the mean threshold value $R_{mean}$ can lie between 3 and 6 g and the high threshold value $R_{high}$ can lie between 5 and 10 g.

The values 1, 2 and 4, for example can be considered as possible values for the amounts $\Delta Z_{small}$, $\Delta Z_{mean}$ and $\Delta Z_{large}$ by which the counter Z is respectively increased on a corresponding exceeding of the threshold value.

The reduction of the counter Z in the case of a falling below of the threshold values $R_{low}$ can e.g. take place by the value $\Delta Z_{red}=2$. A possible value for the threshold counter value $Z_{max}$ lies at 10.

As soon as the counter Z exceeds the pre-determined threshold counter value $Z_{max}$ in the method step 32 and the movement of the motor vehicle is classified as critical in the method state 34, a process for the activation of the vehicle safety system can be initiated.

This process can include the direct initiation of suitable safety measures for the protection of the vehicle occupants, e.g. the activation of airbags, the tightening of seat belts and/or the deployment or flipping up of a roll-over bar or of reinforced neck supports.

Alternatively to the immediate initiation of the safety measures, the process for the activation of the vehicle safety system can, however, also include measures for the verification of the danger of the vehicle movement.

These processes can include the taking account of further parameters or measured values in the evaluation of the vehicle movement in addition to the time change of the vehicle acceleration in a linear direction, i.e. in addition to the vehicle jolt.

The determination of these additional parameters or measured values can already take place during the monitoring of the time change of the vehicle acceleration, i.e. parallel to the detection of the vehicle jolt, or only after a vehicle movement has been classified as critical with reference to the vehicle jolt.

The time changes of the vehicle acceleration in one of the directions or in both directions which were not previously taken into account in the evaluation of the vehicle movement can be considered as the additional vehicle parameters; in the present embodiment, that is, the vehicle jolt in the longitudinal vehicle direction (X direction) or in the vertical direction (Z direction). Furthermore, however, the angular position, the angular speed and/or the angular acceleration of the vehicle about one or more axes of the vehicle can also be used for the evaluation of the danger of the vehicle movement.

As a result, suitable safety measures for the protection of the vehicle occupants would only be triggered when both the time change of the vehicle movement, i.e. the vehicle jolt, in one direction or in a plurality of directions is classified as dangerous and the angular position, the angular speed and/or the angular acceleration of the vehicle with respect to one vehicle axis or to a plurality of vehicle axes each also lie within a pre-determined critical range.

Figure 2A:
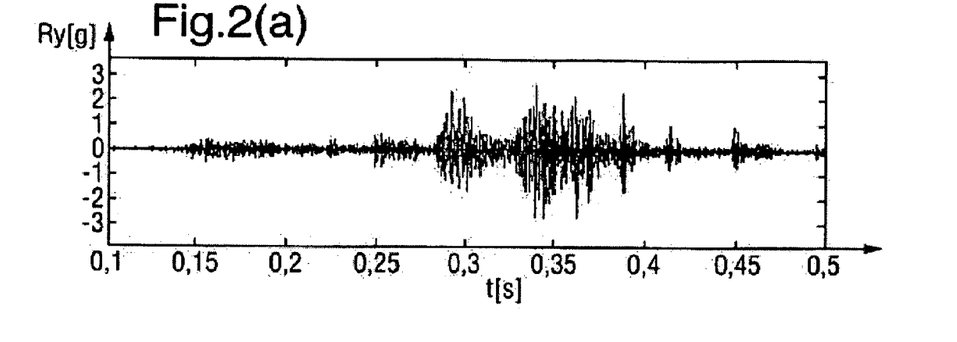
FIGS. 2 and 3 are graphical representations of the time change of the lateral vehicle acceleration in dependence on time in the case of a vehicle movement not resulting in a roll-over of the vehicle.
Figure 2B:
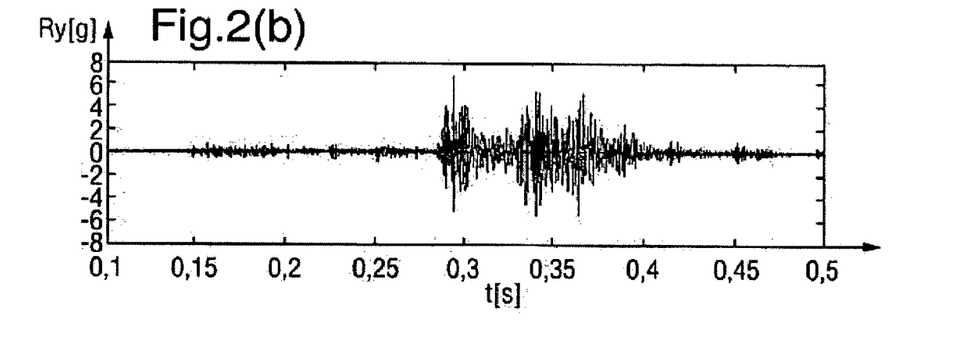
Figure 3A:
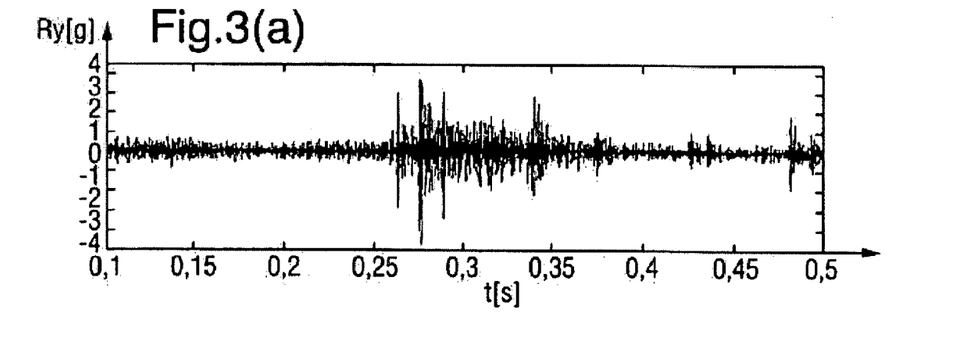
Figure 3B:
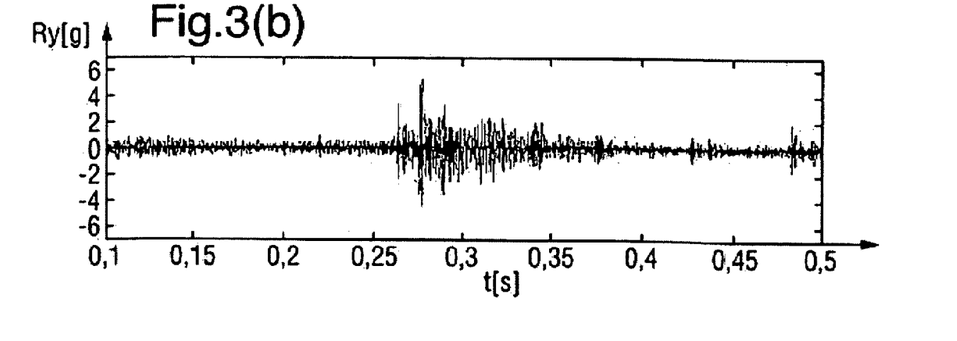
Figure 4A:
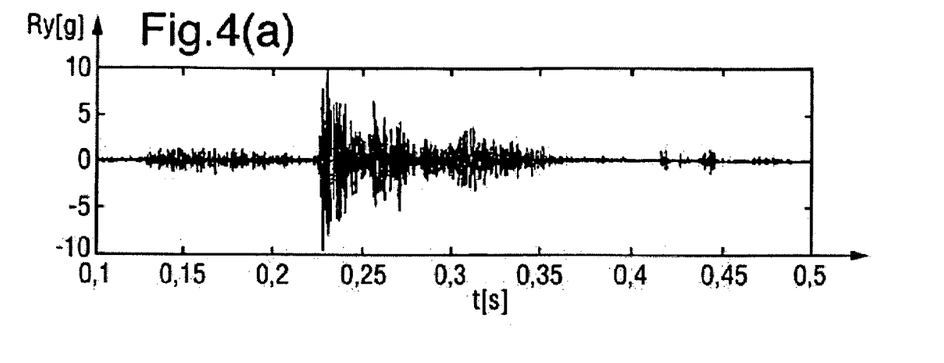
FIGS. 4 and 5 are graphical representations of the time change of the lateral vehicle acceleration in dependence on time in the case of a vehicle movement resulting in a roll-over of the vehicle.
Figure 4B:
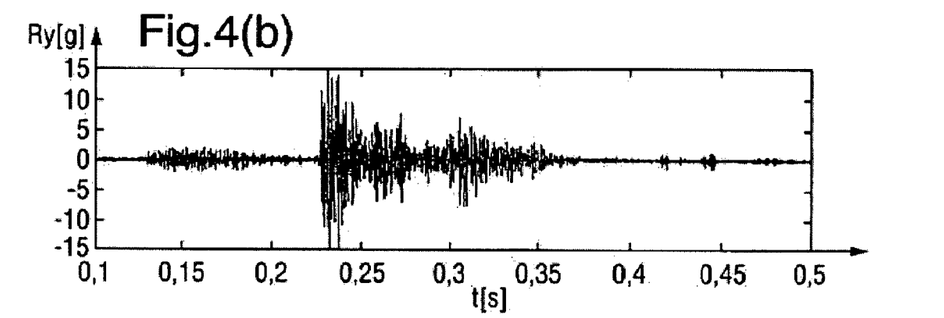
Figure 5A:
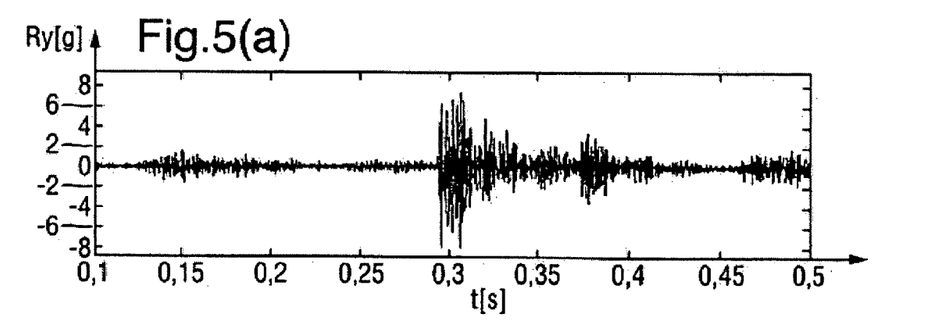
Figure 5B:
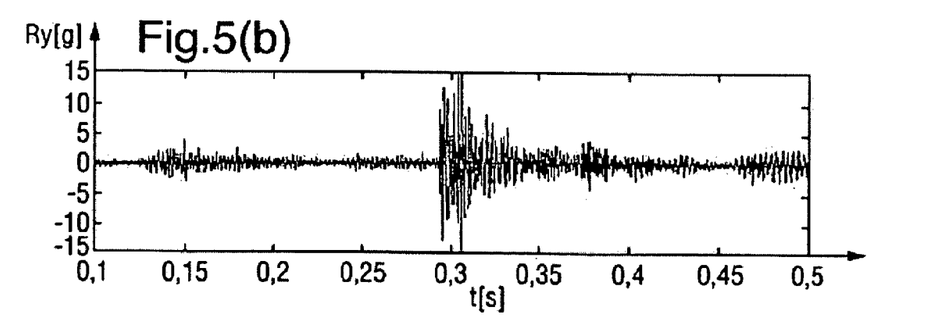

FIGS. 2 to 5 show the time development of a lateral vehicle jolt during different movements of a motor vehicle on skidding off a paved roadway, i.e. on sand contact. A vehicle movement is shown in each of FIGS. 2 and 3 which does not result in a roll-over of the vehicle, whereas FIGS. 4 and 5 illustrate situations in which the vehicle movement actually does end in a roll-over.

In each case, the time change $R_y$ of the vehicle acceleration in the Y direction is shown in dependence on the time t which is given in seconds. The time changes $R_y$ of the vehicle accelerations shown are each standardized to a period length T1 fixed as "1". The vehicle jolt thus has the same unit as the vehicle acceleration and is given in [g] here, with 1 g≈9.81 m/s².

A period length T1 of 0.1 ms, which corresponds to the period with which the acceleration sensor or the acceleration sensors are actually read out, underlies the upper graph (a) of each Figure. In contrast, a period length T1', which is five times the length of the actual read-out period and thus amounts to 0.5 ms, underlies the lower graph (b) of each Figure.

The high threshold value $R_{high}$ on whose exceeding the counter Z is incremented by a large value $\Delta Z_{large}$, was set in the case of the period length T1 (graph a)) to 5 g and in the case of the period length T1' (graph (b)) to 7 g.

As can be seen from FIGS. 2 and 3 (no roll-over), a first significant vehicle jolt is determined approximately between 250 ms and 300 ms after the start of the vehicle movement. In the case of the period length T1 (graph a)), the determined vehicle jolt does not, however, exceed the value 4 g, but it rather remains well below the high threshold $R_{high}$ given as 5 g. In the case of the period length T1', the vehicle jolt also remains substantially below the value 6 g and thus below the fixed high threshold value $R_{high}$ of 7 g.

The time change of the lateral vehicle acceleration behaves differently in the case of a vehicle movement which is so sharp that it results in a roll-over of the vehicle.

As FIG. 4 shows, a comparatively strong vehicle jolt is already detected in the period from 200 ms to 250 ms after the start of the vehicle movement and, in the case of the period length T1 (graph a)) far surpasses the threshold value $R_{high}$ of 5 g and also clearly exceeds the high threshold $R_{high}$ of 7 g in the case of period length T1' (graph b)).

The same also applies to the situation shown in FIG. 5 in which a significant vehicle jolt is detected after approximately 300 ms which far exceeds the respective high threshold values $R_{high}$ both with an underlying period length T1 (graph a)) and with a period length T1' (graph (b)).

FIGS. 2 to 5 illustrate that the time change of the vehicle acceleration in a linear direction represents a suitable parameter for the evaluation of the danger of the movement of a motor vehicle on a corresponding fixing of threshold values.

The taking account of the lateral vehicle jolt in particular permits a reliable and fast prediction of whether a rolling or roll-over movement of the vehicle about its longitudinal axis is to be expected or not.

Figure 6:
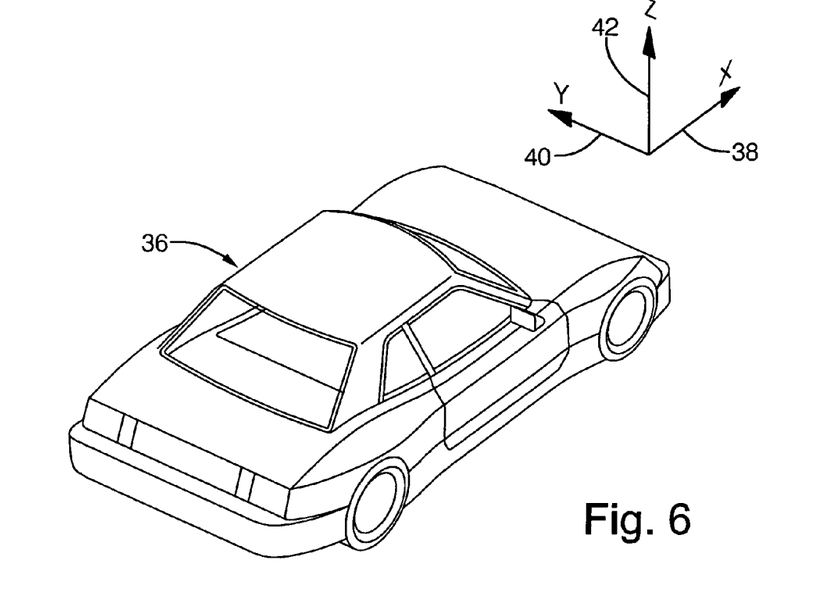
FIG. 6 is a perspective depiction of a motor vehicle, providing reference to its longitudinal axis (X direction), lateral axis (Y direction) and vertical axis (Z direction)

Referring to FIG. 6, a motor vehicle 36 containing one or more safety systems for protecting occupants is illustrated. Mutually normally arranged arrows 38, 40 and 42 depict the vehicle's directional orientation including its longitudinal (X) direction or axis, its lateral (Y) direction or axis, and its vertical (Z) direction or axis, respectively.

Figure 7:
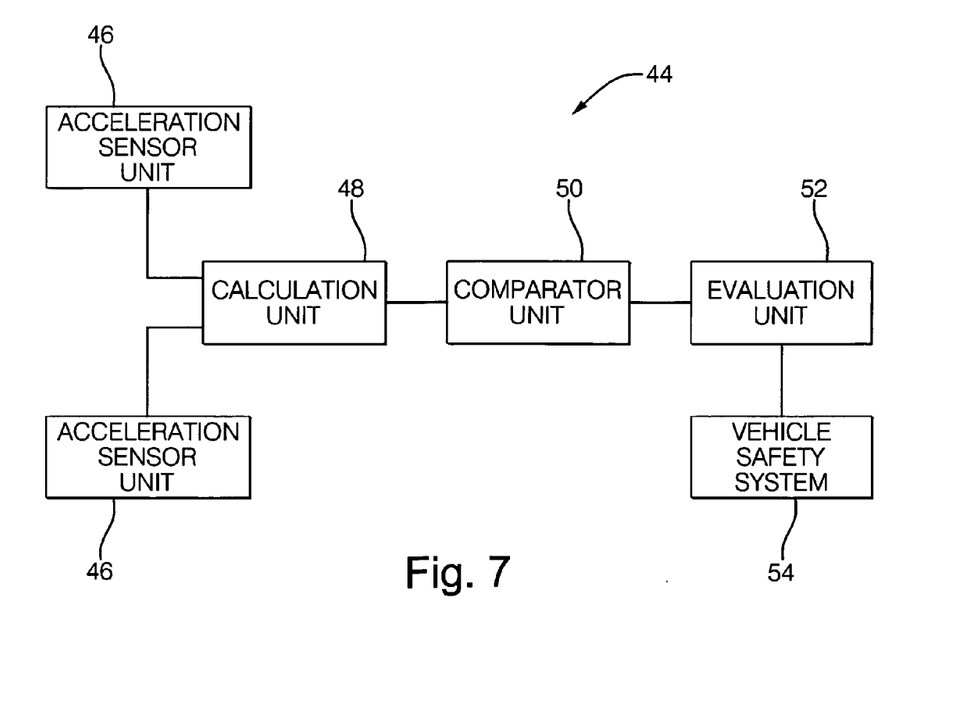
FIG. 7 is a block diagram schematic illustration of an apparatus for the evaluation of the movement of the motor vehicle of FIG. 6, operative to practice the present invention.

Referring to FIG. 7, a motor vehicle movement evaluation apparatus 44, which is preferably installed within the motor vehicle 36 of FIG. 6, is illustrated. The evaluation apparatus 44 includes one or more sensor units such as directionally oriented accelerometers 46. Each accelerometer 46 is specifically mounted within the motor vehicle 36 for the measurement of the acceleration of the motor vehicle 36 in at least one linear direction, in particular in the direction of one of the vehicle's axes (arrows 38, 40 and 42). A calculation unit 48 is connected to the sensor(s) 46 for the determination of the time change of the vehicle acceleration from two measured acceleration values. A comparator unit 50 is connected to the calculation unit 48 for the comparison of the determined time change of the vehicle acceleration with a pre-determined threshold value. An evaluation unit 52 is connected to the comparator unit 50 for the evaluation of a difference of the determined time change of the vehicle acceleration from the threshold value. Finally, the evaluation apparatus 44 is connected to a vehicle safety system apparatus 54 for activation thereof when a movement of the motor vehicle 36 detected in accordance with a method described herein above is classified as critical.

The invention claimed is:

1. A method of evaluating a movement of a motor vehicle, comprising the steps of:
   measuring acceleration of the vehicle in at least one linear direction;
   determining time change of the vehicle acceleration in the at least one linear direction; and
   comparing the time change of vehicle acceleration with a threshold value which varies as a function of previous determinations of time change of vehicle acceleration,
   wherein the determined time change of the vehicle acceleration in the at least one linear direction is taken into account in the evaluation of the vehicle movement.

2. The method of claim 1, wherein the time change of the vehicle acceleration is determined from two measured acceleration values.

3. The method of claim 1, wherein the time change of the vehicle acceleration is determined at least periodically with the period T1.

4. The method of claim 3, further comprising the step of providing a counter for contributing to the evaluation of rotational movement of the vehicle by incrementing when the time change of the vehicle acceleration of a period T1 exceeds a threshold value and/or the counter is reduced when the time change of the vehicle acceleration of a period T1 falls below the threshold value.

5. The method of claim 4, wherein the incrementing and/or reducing of the counter take/takes place by a pre-determined fixed amount.

6. The method of claim 4, wherein the incrementing and/or reducing of the counter take/takes place by a pre-determined whole-number amount, whose magnitude is dependent on the difference of the determined time change of the vehicle acceleration from the threshold value.

7. The method of claim 4, wherein the incrementing and/or reducing of the counter is proportional to the deviation of the determined time change of the vehicle acceleration from the threshold value.

8. The method of claim 4, wherein the vehicle movement is classified as critical when the counter exceeds a pre-determined threshold counter value.

9. The method of claim 8, wherein a vehicle safety system is activated when the vehicle movement is classified as critical.

10. The method of claim 3, wherein a second time change of the vehicle acceleration is additionally determined from two acceleration values which define a time interval T2 which is a whole-number multiple of the period T1.

11. The method of claim 10, wherein the vehicle movement is classified as critical when both the second time change of the vehicle acceleration and every first time change of the vehicle acceleration determined within the time interval T2 each exceed a pre-determined threshold value.

12. The method of claim 11, further comprising the steps of activating a vehicle safety system when a detected movement of the motor vehicle is classified as critical.

13. The method of claim 12, wherein the vehicle safety system is only activated when the angular position, the angular speed and/or the angular acceleration of the vehicle with respect to at least one vehicle axis additionally lies within a pre-determined critical range.

14. An apparatus for the evaluation of a movement of a motor vehicle, comprising at least one sensor for the measurement of acceleration of the vehicle in at least one linear direction;
    a calculation unit connected to the sensor for the determination of the time change of the vehicle acceleration from two measured acceleration values;
    a comparator unit connected to the calculation unit for the comparison of the determined time change of the vehicle acceleration with a threshold value established as a function of a previous determination of time change of vehicle acceleration; and
    an evaluation unit connected to the comparator unit for the evaluation of a difference of the determined time change of the vehicle acceleration from the threshold value.

15. The apparatus of claim 14, further comprising means operative to activate a vehicle safety system in response to a detected movement of said motor vehicle as a function of the difference of the determined time change of the vehicle acceleration from the threshold value.

16. A method of evaluating movement of a motor vehicle along a defined axis as a precursor to a roll-over event, said method comprising the steps of:
    periodically measuring linear acceleration of the motor vehicle along said axis during a defined time period T1;
    determining a time change of vehicle acceleration by comparing at least two time-spaced acceleration values within time period T1;
    comparing the time change of vehicle acceleration with a threshold value,
    providing a counter operable to incrementally reset when the time change of the vehicle acceleration of the period T1 exceeds the threshold value and decrementally reset when the time change of the vehicle acceleration of the period T1 falls below the threshold value; and
    providing an input to a vehicle passenger safety system indicative of detection of vehicle movement within a pre-determined critical range in response to said counter reaching a predetermined count value.

* * * * *